United States Patent
Baur et al.

(10) Patent No.: US 9,342,092 B2
(45) Date of Patent: May 17, 2016

(54) METHOD FOR OPERATING A VEHICLE WITH AN AUTOMATIC DRIVING MODE

(71) Applicant: Volkswagen Aktiengesellschaft, Wolfsburg (DE)

(72) Inventors: Elmar Baur, Juebar (DE); Linn Hackenberg, Wolfsburg (DE); Lennart Bendewald, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/640,340

(22) Filed: Mar. 6, 2015

(65) Prior Publication Data

US 2015/0253804 A1    Sep. 10, 2015

(30) Foreign Application Priority Data

Mar. 7, 2014    (DE) .......................... 10 2014 204 266

(51) Int. Cl.
*G05G 1/40* (2008.04)
*G05G 1/42* (2008.04)
*G05G 1/44* (2008.04)

(52) U.S. Cl.
CPC .. *G05G 1/40* (2013.01); *G05G 1/42* (2013.01); *G05G 1/44* (2013.01)

(58) Field of Classification Search
CPC .............. G05G 1/40; G05G 1/44; G05G 1/42
See application file for complete search history.

(56) References Cited

U.S. PATENT DOCUMENTS

| | | | | | |
|---|---|---|---|---|---|
| 3,975,972 | A * | 8/1976 | Muhleck | ............... | B60K 26/02 74/512 |
| 4,502,348 | A * | 3/1985 | Bauer | ..................... | F02D 11/02 74/482 |
| 6,192,724 | B1 * | 2/2001 | Vito | ...................... | B60R 25/005 70/202 |
| 9,096,150 | B2 * | 8/2015 | Cuddihy | ............... | B60N 2/143 |
| 2003/0115916 | A1 * | 6/2003 | Vito | ...................... | B60R 25/005 70/225 |
| 2009/0078666 | A1 * | 3/2009 | Seino | ................... | E02F 9/0866 212/347 |
| 2012/0083958 | A1 * | 4/2012 | Ballard | ................ | B60W 10/06 701/22 |
| 2015/0149035 | A1 * | 5/2015 | Enthaler | ............... | B60K 37/06 701/36 |
| 2015/0298652 | A1 * | 10/2015 | Ng | ........................ | B60R 25/006 70/238 |

* cited by examiner

*Primary Examiner* — Drew Brown
(74) *Attorney, Agent, or Firm* — Muncy, Geissler, Olds & Lowe, P.C.

(57) ABSTRACT

A method for operating a vehicle that can be operated in a manual driving mode and in an automatic driving mode and has at least one foot actuation device, which in the manual driving mode projects from a plane of a resting surface and can be actuated by a vehicle driver, wherein a switch from the manual driving mode to the automatic driving mode is detected and thereupon the at least one foot actuation device and/or the resting surface are moved relative to one another in such a way that the at least one foot actuation device and the resting surface form a substantially continuous plane or the resting surface forms a substantially continuous plane and the foot actuation device is covered by the plane of the resting surface.

20 Claims, 4 Drawing Sheets

METHOD FOR OPERATING A VEHICLE WITH AN AUTOMATIC DRIVING MODE

This nonprovisional application claims priority under 35 U.S.C. §119(a) to German Patent Application No. 10 2014 204 266.6, which was filed in Germany on Mar. 7, 2014, and which is herein incorporated by reference.

BACKGROUND OF THE INVENTION

1. Field of the Invention

The present invention relates to a method for operating a vehicle with a manual and automatic driving mode, in which during a switch from the manual to the automatic driving mode a foot actuation device and/or a resting surface are moved relative to one another. Moreover, the invention relates to a device for a vehicle with a foot pedal device, a resting surface, and a device for moving the foot pedal device and resting surface relative to one another.

2. Description of the Background Art

Vehicles are known that can be driven partially automatically or automatically. In this case, the vehicle is at least partially no longer steered by the driver. Control systems in the vehicle or in the environment take over the vehicle guidance. In so doing, the driver is no longer occupied with the vehicle controls but can use the time for other activities. These can extend from sleeping and relaxing to reading or working with digital media. The driver should feel as comfortable as possible during these activities. It would be advantageous here, for example, if the driver could extend his feet and in so doing no pedals or other actuation devices would restrict the driver's foot space in the vehicle.

SUMMARY OF THE INVENTION

It is therefore an object of the present invention to optimize the comfort of the vehicle driver and to increase his freedom of movement, while the vehicle is in the automatic driving mode.

In an embodiment, the method of the invention is used to operate a vehicle that can be operated in a manual and automatic driving mode. The vehicle has at least one foot actuation device, such as a pedal, which in the manual driving mode projects from a plane of a resting surface and can be actuated by a vehicle driver. A switch from the manual driving mode to the automatic driving mode is detected and thereupon the foot actuation device and/or the resting surface are moved relative to one another, so that the foot actuation device and resting surface form a substantially continuous plane or the resting surface forms a substantially continuous plane and the foot actuation device is covered by the plane of the resting surface.

In the automatic driving mode the driver can now place his feet comfortably, because the continuous plane offers the driver a sufficiently large and flat resting place for his feet. Moreover, the foot actuation device does not hinder the driver and he can stretch out his legs.

The device of the invention comprises a foot actuation device and a resting surface. In addition, a device is provided for a relative movement of the foot actuation device and/or the resting surface to one another. The movement has the goal that the foot actuation device and the resting surface form a substantially continuous plane or the resting surface forms a substantially continuous plane and the foot actuation device is covered by the plane of the resting surface.

In a manual driving mode the vehicle guidance rests with the driver himself. The driver therefore takes over the manual control of the vehicle. In contrast, an automatic driving mode of the vehicle is a state in which the vehicle guidance is controlled at least partially by control systems in the vehicle. For example, control of the steering or brake can occur via the respective vehicle control devices. In an automatic driving mode according to the invention, the functions operated by the foot actuation device are controlled by vehicle control systems. For example, a taking over of the braking and driving functions by the vehicle is conceivable.

The foot actuation device in the manual driving mode protrudes from the plane of the resting surface and can be actuated by the driver. In other words, it is possible for the driver to actuate the foot actuation device with his foot. The resting surface can be located behind the foot actuation device in the longitudinal direction of the vehicle. This corresponds to the widely used structure of a pedal system in the vehicle in which the pedal projects into the footwell and during operation the pedal is moved in the direction of the resting surface. The resting surface in this case can form the end of the footwell of the vehicle relative to the engine compartment. A separate resting surface is also conceivable, however, which is arranged above another surface for delimiting the footwell. The resting surface in the manual driving mode can also be disposed above the foot actuation device in the vertical direction of the vehicle.

When switching from the manual to the automatic driving mode, movement of the foot actuation device and/or resting surface relative to one another occurs, as a result of which a substantially continuous plane is formed. Such a movement can occur translationally or by a rotation. It is possible in this case that only the foot actuation device or resting surface moves and the respective other part remains in its position. Likewise, a joint movement of the foot actuation device and resting surface is conceivable. If the foot actuation device is located before the resting surface in the longitudinal direction of the vehicle, the foot actuation device can be pivoted, for example, by a rotation in the direction of the resting surface. It is also possible that the resting surface is shifted in the direction of the foot actuation device, so that the foot actuation device and resting surface form a continuous plane. If the resting surface is above the foot actuation device in the vertical direction of the vehicle, rotation of the resting surface is possible, so that the resting surface is pivoted over the foot actuation device and itself forms the continuous plane.

If the continuous plane is formed by the foot actuation device and the resting surface, the resting surface can have recesses that correspond substantially to the cross section of the foot actuation device. In this way, the foot actuation device can be moved into the resting surface and thus form a continuous plane. If the continuous plane is formed by the resting surface itself, the resting surface should be designed flat and large enough for the driver's feet.

The driving mode can be detected by a control unit in the vehicle. The control unit for this purpose can be connected to an input unit and/or different control devices of the vehicle. For example, via the input unit the driver can enter his desire to switch the vehicle from the manual mode to the automatic mode. The input unit can serve simultaneously as a display unit to show the driver the driving mode of the vehicle. The control devices take over the control of different vehicle systems, such as the steering system or brake system, and optionally control the vehicle guidance during the automatic driving mode. The control unit receives information on the driving mode via the connection to the input unit and/or the control systems. A switch from the manual to the automatic driving mode can be detected in this way. The control unit in the case of a switch in the driving mode triggers the foot actuation device and/or resting surface, so that they are moved relative to one another. A control device of the vehicle can also be connected directly to the foot actuation device and/or the resting surface and control these.

If there is a switch from the automatic driving mode to the manual driving mode, the foot actuation device and/or resting surface return to the position for the manual driving mode in which the foot actuation device protrudes from the plane of the resting surface and the foot actuation device can be actuated again. This switch back to the manual driving mode is foreseeable by the driver in a vehicle during normal operation, so that a taking over of the vehicle guidance proceeds without any problems. In the case of a critical driving situation or failure of or faults in vehicle functions or control systems, a taking over by the driver must occur both rapidly and intuitively. For this purpose, the movement of the foot actuation device and/or the resting surface to the position for the manual driving mode should occur within a short time period. The device for moving the foot actuation device and/or resting surface must be designed accordingly. The control unit can be used to monitor the control systems and vehicle functions or a separate monitoring unit is provided.

In addition to the adjustment of the foot actuation device and/or resting surface in the automatic driving mode, further improvement of the driver's comfort is conceivable by adjusting the driver's seat to a comfortable position. This position can be changed according to the adjustment of the foot actuation device and/or the resting surface. For example, the seat is moved in the longitudinal direction of the vehicle until the legroom for the driver is optimally adjusted relative to the continuous plane. Preferably, in addition the back rest of the seat is pivoted into a position in which the driver can relax well. Especially preferably, this seat adjustment occurs automatically during the switch from the manual driving mode to the automatic driving mode.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
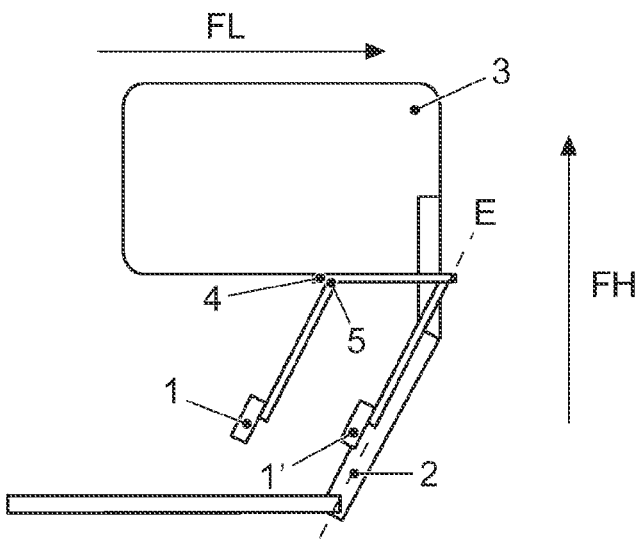
FIGS. 1a to 1c show a section of a vehicle interior according to an embodiment.

A section of a vehicle interior is illustrated in FIG. 1a. A foot actuation device 1 in the form of a pedal is disposed on vehicle body 3. A resting surface 2 lies behind foot actuation device 1 in the longitudinal direction of the vehicle FL. The vehicle is in a manual driving mode while foot actuation device 1 projects from a plane of the resting surface E. Foot actuation device 1 can be actuated in this way. In other words, a driver of the vehicle can reach foot actuation device 1 and actuate it according to its function. In a switch of the driving mode to the automatic driving mode, said mode is detected by a control unit of the vehicle. In the case of a switch, the control unit controls foot actuation device 1 such that foot actuation device 1 is moved automatically relative to resting surface 2. After this movement, foot actuation device 1' substantially forms a continuous plane with resting surface 2. The movement occurs in the form of a shift. A track 4 in which end 5 of foot actuation device 1 can slide along is used for realizing the shift.

Figure 1B:
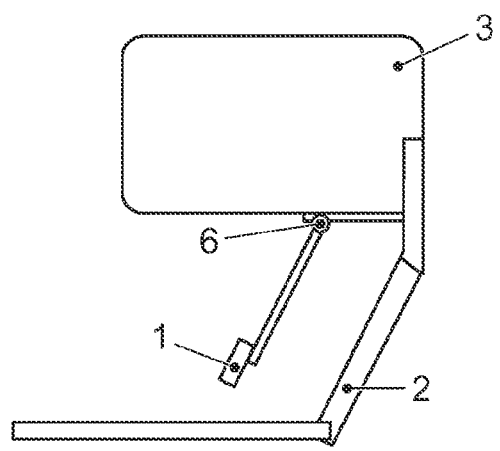

FIG. 1b shows a similar embodiment with foot actuation device 1 and resting surface 2. In contrast to the embodiment in FIG. 1b, end 5 of foot actuation device 1 is connected to vehicle body 3 by a swivel joint 6. In case of a switch from the manual to the automatic driving mode, foot actuation device 1 pivots around swivel joint 6 in the direction of resting surface 2. After the pivoting movement, foot actuation device 1 is in contact with resting surface 2 and forms a substantially continuous plane.

Figure 1C:
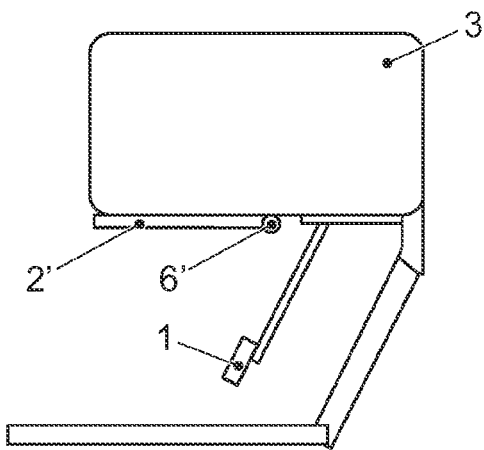

Alternatively, it is possible to couple resting surface 2' with a swiveling joint 6' as a device for moving resting surface 2' to vehicle body 3; see FIG. 1c. In this case, resting surface 2' lies against vehicle body 3 in the manual driving mode. In other words, resting surface 2' is arranged above foot actuation device 1 in the vertical direction of the vehicle FH. With a switch to the automatic driving mode, resting surface 2' pivots in the direction of foot actuation device 1 and covers foot actuation device 1. Resting surface 2' thus forms a continuous plane.

In the automatic driving mode the driver can therefore place his feet comfortably in the footwell of the vehicle. Foot actuation device 1' and resting surface 2 or resting surface 2' form a flat and sufficiently large plane, so that the comfort for the driver is greatly increased. In addition, both the device for movement in the form of a track 4 and also in the form of a swivel joint 6, 6' for moving foot actuation device 1, 1' and/or resting surface 2, 2' are simple in design. As a result, the structures of the device of the invention are cost-effective in terms of production and reliable in operation.

Figure 2A:
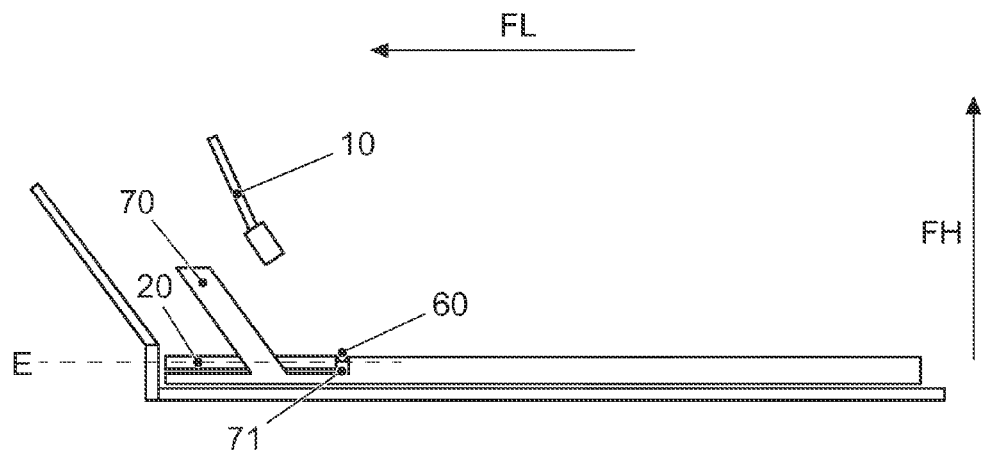
FIGS. 2a and 2b show a section of a vehicle interior according to an embodiment of the device of the invention for carrying out the method of the invention.
Figure 2B:
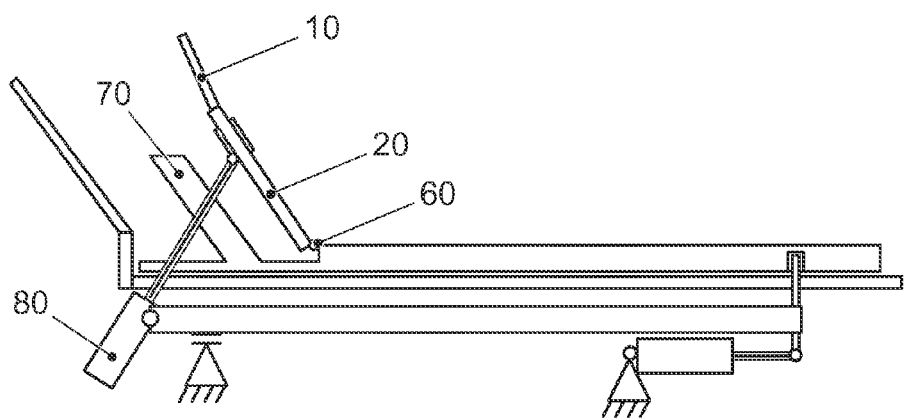

FIGS. 2a and 2b show an alternative embodiment of a vehicle for carrying out the method of the invention. A foot actuation device 10 is attached to a vehicle body, which is not shown. A bottom region 70 has a stop surface for foot actuation device 10. A resting surface 20, which is connected via a swivel joint 60 to the bottom region, is arranged in turn on the bottom region. In the manual driving mode of the vehicle, as shown in FIG. 2a, resting surface 20 lies below foot actuation device 10 in the vertical direction of the vehicle FH. Foot actuation device 10 thus protrudes from plane E in which resting surface 20 lies. Resting surface 20 in this case is located in an indentation 71 of the bottom region. As a consequence, in the manual driving mode it is unobtrusive for the driver and does not hinder him in the actuation of the foot actuation device and the guiding of the vehicle.

With a switch to the automatic driving mode of the vehicle, resting surface 20 moves around swivel joint 60 in the direction of foot actuation device 10. This pivoting movement concludes when resting surface 20 is at the same level as foot actuation device 10 and thus forms a substantially continuous plane. When driving in automatic driving mode the driver can then place his feet on this continuous plane. Foot actuation device 10 also does not hinder the driver. The pivoting movement is realized automatically with the aid of an actuator 80, for example, an electric motor. To this end, actuator 80 can be connected to a control unit of the vehicle. If the control unit detects a switch from the manual to the automatic driving mode, the control unit outputs a signal to actuator 80. Thereupon, actuator 80 guides resting surface 20 via swivel joint 60, so that it can perform a pivoting movement. For example, actuator 80 and swivel joint 60 function as a device for moving resting surface 20.

With a switch from the automatic back to the manual driving mode, resting surface 20 is returned to the starting position. Resting surface 20 is again disposed in bottom region 70 and the driver can take over the vehicle guidance. If the control unit of the vehicle notes a malfunction in the control systems that take over the vehicle guidance in the automatic driving mode or other critical faults, a rapid switch from the automatic driving mode to the manual driving mode is necessary. In this case, foot actuation device 10 must be rapidly accessible and actuatable by the driver. This is realized with the embodiment according to FIGS. 2a and b. In such a case, resting surface 20 due to gravity falls in the direction of bottom region 70, for example, and foot actuation device 10 is again accessible. It is also conceivable that in this emergency situation, a light pressure by the driver with his feet suffices and resting surface 20 moves from foot actuation device 10 in the direction of bottom region 70. The rapid adjustment to the switch from the automatic to the manual driving mode is thus reliably assured and the swift taking over of the vehicle guidance by the driver is guaranteed.

A further embodiment is shown in FIGS. 3a to 3e. According to FIGS. 3a and b, a foot actuation device 100 in the manual driving mode is above a bottom region 700 of the vehicle and a resting surface 200 in the vertical direction of the vehicle FH. Foot actuation device 100 can therefore be actuated by a driver of the vehicle. Resting surface 200 has a sliding element 210. Bottom region 700 again has a track 710. For example, sliding element 210 and track 710 engage in one another and serve as a device for a translational movement of resting surface 200. An actuator 800 in the form of a drive is provided to drive sliding element 210. Foot actuation device 100 together with another foot actuation device 100' forms a pedal system (see FIG. 3b, which is a top plan view of FIG. 3a).

Figure 3A:
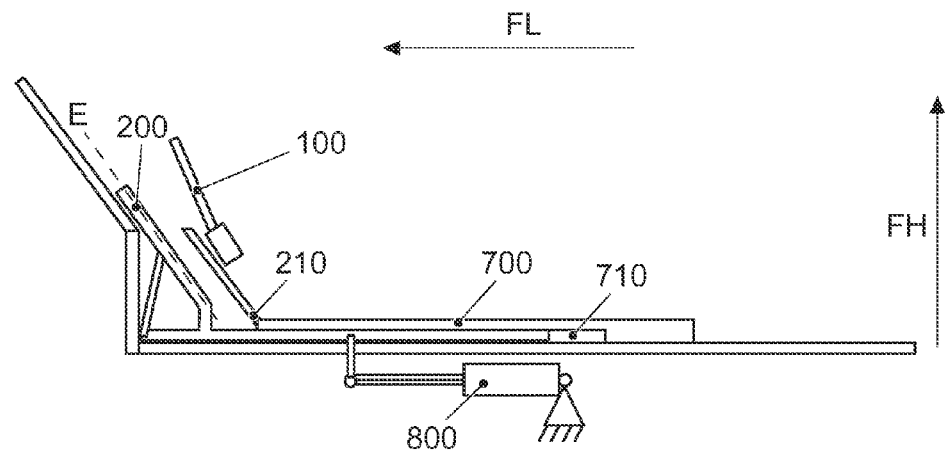
FIGS. 3a to 3e show sections of a vehicle interior according to an embodiment of the device of the invention for carrying out the method of the invention.
Figure 3B:
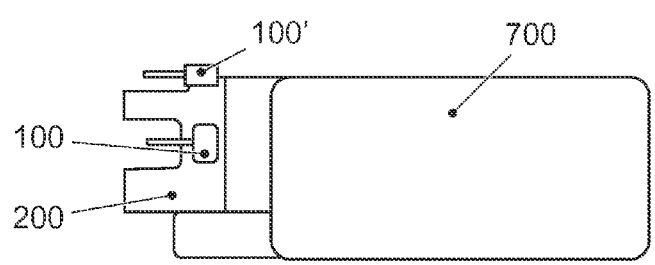
Figure 3C:
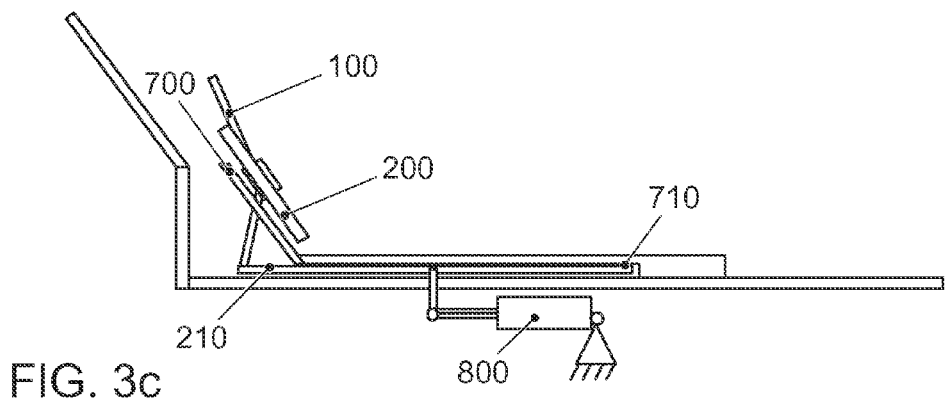
Figure 3D:
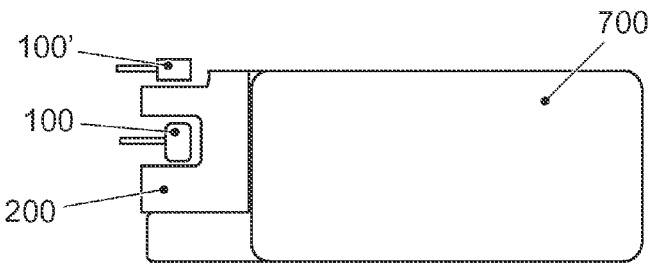

Resting surface 200 in the automatic driving mode is illustrated in FIGS. 3c and d. After the switch to the automatic driving mode, sliding element 210 slides forward in track 710 in the longitudinal direction of the vehicle FL with the aid of actuator 800 until resting surface 200 is at the same level as foot actuation device 100. In this way, foot actuation device 100 and foot actuation device 100' can form a substantially continuous plane with resting surface 200. This is shown in the top plan view of FIG. 3d.

Figure 3E:
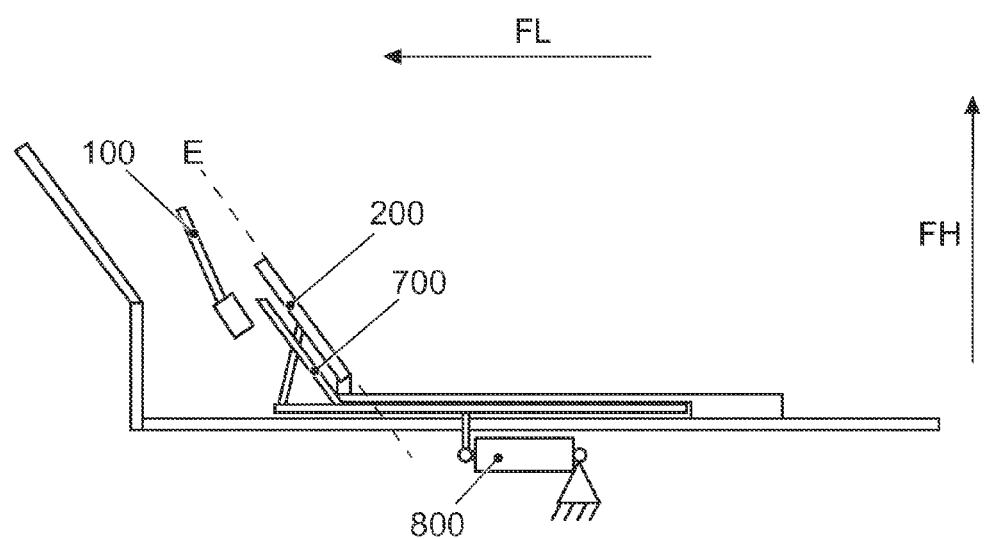

In the automatic driving mode, resting surface 200 can assume a different position, as illustrated in FIG. 3e. In this case, resting surface 200 moves farther forward in the longitudinal direction of the vehicle FL. Resting surface 200 in this case covers part of foot actuation device 100 and foot actuation device 100'. Foot actuation device 100 is therefore covered by plane E of resting surface 200. Resting surface 200 itself thus forms a continuous plane on which the driver can place his feet. Consequently, it is therefore conceivable for the driver to adjust the distance of the continuous plane. It is thus possible for the driver to adjust the continuous plane according to his wishes, so that he can support his feet comfortably.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a vehicle that is operable in a manual driving mode and in an automatic driving mode and has at least one foot actuation device, which in the manual driving mode projects from a plane of a resting surface and actuated by a vehicle driver, the method comprising:
    detecting a switch from the manual driving mode to the automatic driving mode; and
    moving the at least one foot actuation device and/or the resting surface relative to one another such that in the automatic driving mode, the at least one foot actuation device and the resting surface form a substantially continuous plane or the resting surface forms the substantially continuous plane and the foot actuation device is covered by the plane of the resting surface,
    wherein the substantially continuous plane forms an obtuse angle relative to a floor of a legroom section of the vehicle.

2. The method according to claim 1, wherein the switch from the manual driving mode to the automatic driving mode is detected by a control unit.

3. The method according to claim 2, wherein the control unit during the switch from the manual driving mode to the automatic driving mode triggers the foot actuation device and/or the resting surface.

4. The method according to claim 1, wherein a driver's seat of the vehicle is adjusted during the switch from the manual driving mode to the automatic driving mode.

5. The method according to claim 1, wherein the switch from the automatic driving mode to the manual driving mode is detected and thereupon the at least one foot actuation device and/or the resting surface are moved relative to one another such that the foot actuation device protrudes from the plane of the resting surface and the foot actuation device is actuatable again.

6. The method according to claim 1, wherein the movement of the foot actuation device and/or the resting surface during the switch from the manual driving mode to the automatic driving mode is a rotation.

7. The method according to claim 6, wherein, during the switch from the manual driving mode to the automatic driving mode, the resting surface is pivoted in a direction of the foot actuation device.

8. The method according to claim 6, wherein, during the switch from the manual driving mode to the automatic driving mode, the foot actuation device is pivoted in a direction of the resting surface.

9. The method according to claim 1, wherein the movement of the foot actuation device and/or the resting surface during the switch from the manual driving mode to the automatic driving mode is a translation.

10. The method according to claim 9, wherein, during the switch from the manual driving mode to the automatic driving mode, the foot actuation device is shifted in the direction of the resting surface.

11. The method according to claim 1, wherein, in the manual driving mode, the resting surface forms an end of a footwell relative to an engine compartment.

12. The method according to claim 1, wherein, in the manual driving mode, the resting surface is disposed above the foot actuation device in a vertical direction of the vehicle.

13. A method for operating a vehicle that is operable in a manual driving mode and in an automatic driving mode and has at least one foot actuation device, which in the manual driving mode projects from a plane of a resting surface and is actuated by a vehicle driver, the method comprising:
- detecting a switch from the manual driving mode to the automatic driving mode; and
- moving the at least one foot actuation device and/or the resting surface relative to one another such that the at least one foot actuation device and the resting surface from a substantially continuous plane of the resting surface forms the substantially continuous plane and the foot actuation device is covered by the plane of the resting surface,
- wherein, during the switch from the manual driving mode to the automatic driving mode, the resting surface is shifted in a direction of the foot actuation device.

14. A device for a vehicle comprising:
- a foot actuation device;
- a resting surface; and
- a support device for moving the foot actuation device and/or resting surface relative to one another so that in the automatic driving mode, a substantially continuous plane is formed by the foot actuation device and the resting surface or the substantially continuous plane is formed by the resting surface and the foot actuation device is covered at least partially by the resting surface, wherein the substantially continuous plane forms an obtuse angle relative to a floor of a legroom section of the vehicle.

15. The device according to claim 14, wherein the device further comprises a control unit for detecting a driving mode of the vehicle.

16. The device according to claim 15, wherein the control unit triggers the foot actuation device and/or the resting surface.

17. The device according to claim 14, wherein the resting surface has recesses that correspond substantially to a cross section of the foot actuation device.

18. The device according to claim 14, wherein the support device for moving the foot actuation device and/or resting surface comprises a track.

19. The device according to claim 14, wherein the support device for moving the foot actuation device and/or resting surface comprises a swivel joint.

20. The device according to claim 14, wherein the support device for moving the foot actuation device and/or resting surface comprises an actuator or a motor.

* * * * *